(12) United States Patent
Chen et al.

(10) Patent No.: US 11,802,580 B2
(45) Date of Patent: Oct. 31, 2023

(54) ALUMINUM ASSEMBLY

(71) Applicant: emoono CO., LTD., New Taipei (TW)

(72) Inventors: Pai-Chin Chen, New Taipei (TW); Shiue-Chiau Liu, New Taipei (TW); Yuan-Po Hsu, New Taipei (TW)

(73) Assignee: emoono CO., LTD., New Taipei (TW)

( * ) Notice: Subject to any disclaimer, the term of this patent is extended or adjusted under 35 U.S.C. 154(b) by 363 days.

(21) Appl. No.: 17/170,704

(22) Filed: Feb. 8, 2021

(65) Prior Publication Data
US 2021/0276070 A1 Sep. 9, 2021

(30) Foreign Application Priority Data
Mar. 6, 2020 (TW) .................. 109202572

(51) Int. Cl.
*F16B 5/00* (2006.01)
*B21C 23/04* (2006.01)
*B21C 23/14* (2006.01)

(52) U.S. Cl.
CPC .......... *F16B 5/0044* (2013.01); *B21C 23/145* (2013.01)

(58) Field of Classification Search
CPC .......... B21C 23/145; F16B 3/00; F16B 5/002; F16B 5/0036; F16B 5/0044; F16B 5/0052; F16B 12/20; Y10T 403/7043; Y10T 403/7045; Y10T 403/7092; Y10T 403/7096
USPC .................. 403/363, 364, 380, 382
See application file for complete search history.

(56) References Cited

U.S. PATENT DOCUMENTS

| | | | | |
|---|---|---|---|---|
| 3,363,386 A | * | 1/1968 | Elflein | F16B 5/0044 52/578 |
| 4,236,363 A | * | 12/1980 | Vinther | F16B 5/0044 52/582.1 |
| 4,722,633 A | * | 2/1988 | Bergheim | F16B 5/0044 403/248 |
| 6,513,862 B2 | * | 2/2003 | Dodson | E06B 3/486 296/147 |
| 2021/0131466 A1 | * | 5/2021 | Coles | F16B 5/0044 |

FOREIGN PATENT DOCUMENTS

| | | | |
|---|---|---|---|
| DE | 102008029935 B3 | * | 12/2009 |
| EP | 0324722 A1 | * | 7/1989 |
| EP | 1688626 A1 | * | 8/2006 |
| EP | 3115623 A1 | * | 1/2017 |
| FR | 2769958 A1 | * | 4/1999 |

* cited by examiner

*Primary Examiner* — Josh Skroupa
(74) *Attorney, Agent, or Firm* — Leong C. Lei

(57) ABSTRACT

An aluminum assembly includes at least an aluminum member. Each aluminum member has a first coupling element and a second coupling element extended from two edges of the aluminum member. The first coupling element has a first groove section and a first protrusion. The first groove section has a first fastener and a second fastener. The second coupling element has a second groove section and a second protrusion. The second groove section has a third fastener and a fourth fastener. As such, the first coupling element of a first aluminum member may be detachably coupled to the second coupling element of a second aluminum member, and the second coupling element of the first aluminum member may be coupled to the first coupling element of a third aluminum member. An aluminum assembly of various forms may be constructed in this way.

3 Claims, 6 Drawing Sheets

US 11,802,580 B2

ALUMINUM ASSEMBLY

BACKGROUND OF THE INVENTION

(a) Technical Field of the Invention

The present invention is generally related to aluminum assemblies, and more particular to an aluminum assembly constructed by detachably joining aluminum members without using screws or adhesives into various forms.

(b) Description of the Prior Art

To avoid excessive objects crowding a limited living or working space, people rely on effective storage of these objects.

Objects are usually stored in cabinets, boxes, or shelves, which often require tools and fasteners such as screws and bolts to assemble. For inexperienced users or people lacking appropriate tools, the assembly process could be quite frustrating. Badly assembled cabinets, boxes, or shelves could even induce harm to the users or damage to the stored objects.

SUMMARY OF THE INVENTION

To obviate the above shortcomings, the present invention teaches an aluminum assembly comprising at least an aluminum member. Each aluminum member has a first coupling element and a second coupling element extended from two edges of the aluminum member. The first coupling element has a first groove section and a first protrusion. The first groove section has a first fastener and a second fastener. The second coupling element has a second groove section and a second protrusion. The second groove section has a third fastener and a fourth fastener. As such, the first coupling element of a first aluminum member may be detachably coupled to the second coupling element of a second aluminum member, and the second coupling element of the first aluminum member may be coupled to the first coupling element of a third aluminum member. An aluminum assembly of various forms may be constructed in this way.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
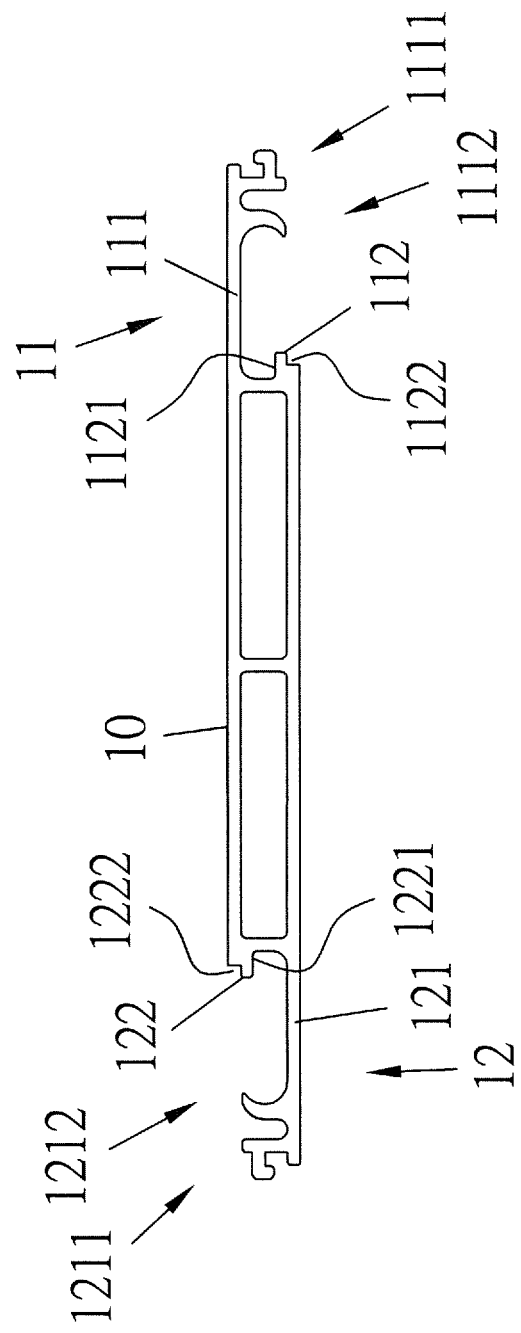
FIG. 1 is a cross-sectional diagram showing an aluminum member according to a first embodiment of the present invention where the aluminum body has a plate shape.

As shown in FIG. 1, an aluminum assembly mainly includes the following elements.

Figure 2:
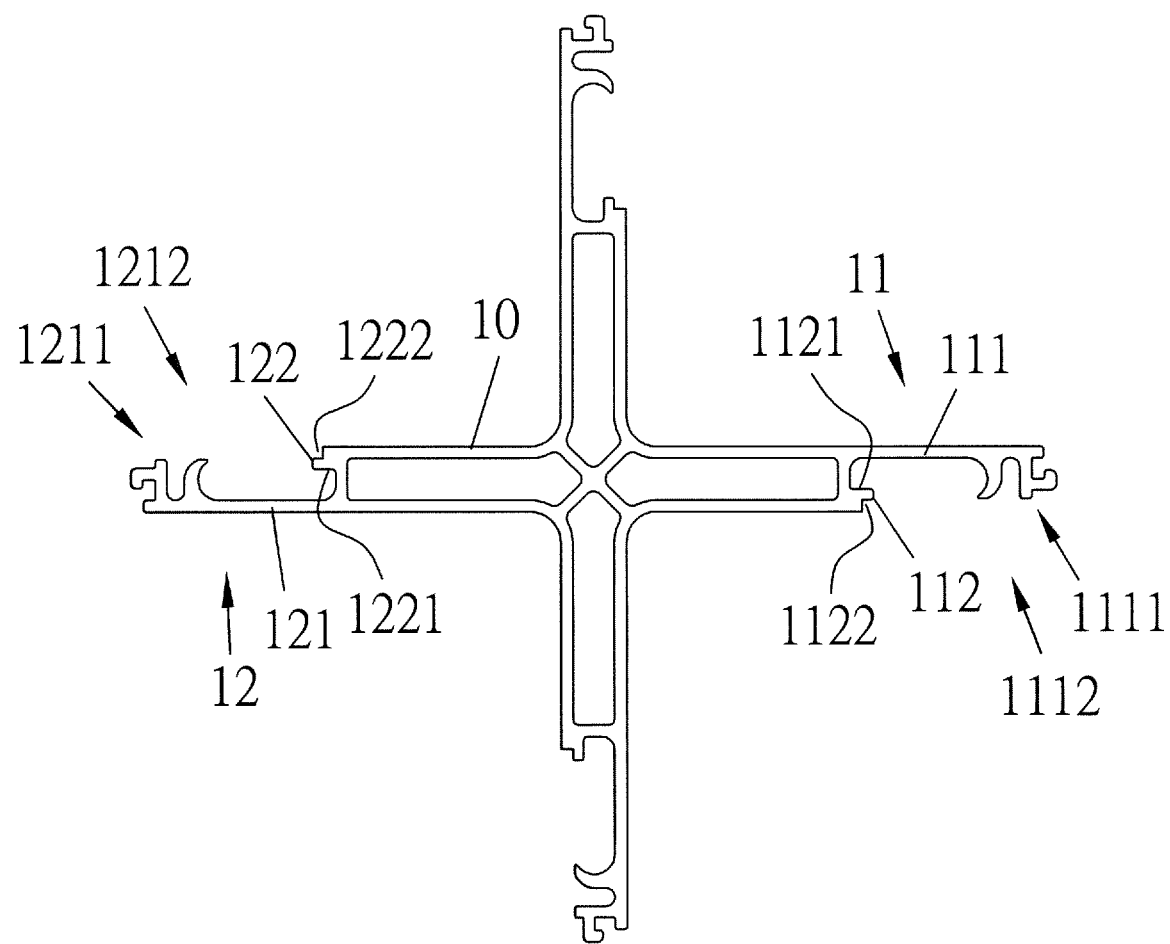
FIG. 2 is a cross-sectional diagram showing an aluminum member according to a second embodiment of the present invention where the aluminum body has an extruded cross shape.
Figure 3:
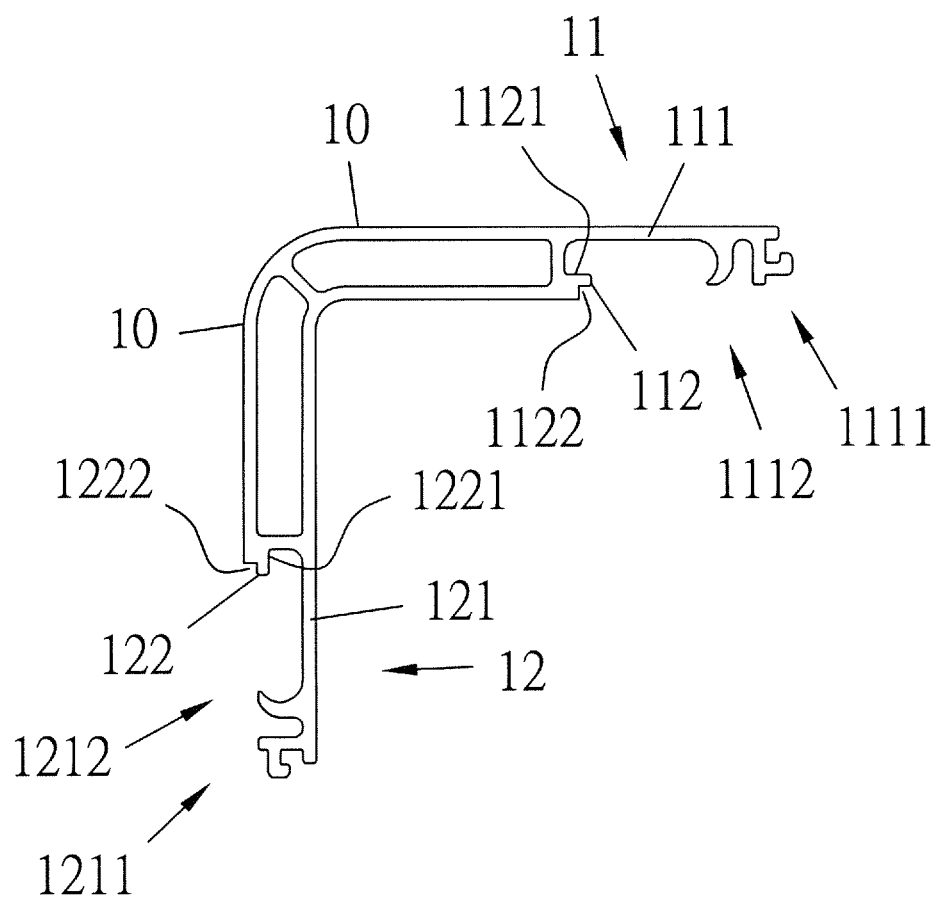
FIG. 3 is a cross-sectional diagram showing an aluminum member according to a third embodiment of the present invention where the aluminum body has an extruded L shape.
Figure 4:
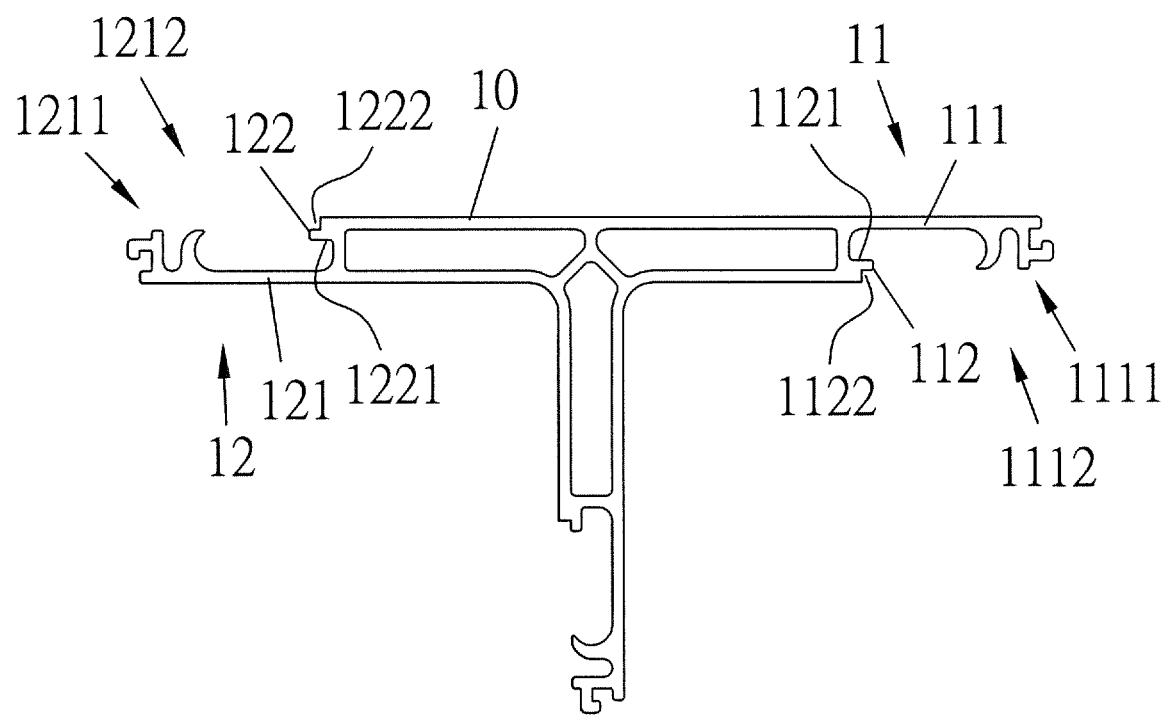
FIG. 4 is a cross-sectional diagram showing an aluminum member according to a third embodiment of the present invention where the aluminum body has an extruded T shape.

There is at least an aluminum member 10, where a first coupling element 11 and a second coupling element 12 are respectively provided along the aluminum member 10's two edges and, as shown in FIGS. 2 to 4, the aluminum member 10 may have a plate shape, an extruded cross shape, an extruded L shape, or an extruded T shape.

The first coupling element 11 includes a first groove section 111 and a first protrusion 112, both extended from a first edge of the aluminum member 10. The first groove section 111 includes a lateral piece (not numbered), a first fastener 1111, and a second fastener 1112. The lateral piece is level with the first major surface of the aluminum member 10. The first and second fasteners 1111 and 1112 are protruding from and perpendicularly to the lateral piece adjacent to an outer edge of the lateral piece. The first fastener 1111 is farther away from the aluminum member 10 and there is a fixed distance between the first and second fasteners 1111 and 1112. The first protrusion 112 is level with a second major surface of the aluminum member 10 opposite to the first major surface.

A fixed interval is preserved between the first protrusion 112 and the second fastener 1112. The first protrusion 112 includes a first step 1121 and a second step 1122, where the first step 1121 is closer to the first groove section 111.

The second coupling element 12 includes a second groove section 121 and a second protrusion 122, both extended from a second edge of the aluminum member 10. The second groove section 121 includes a lateral piece (not numbered), a third fastener 1211, and a fourth fastener 1212. The lateral piece is level with the second major surface of the aluminum member 10. The third and fourth fasteners 1211 and 1212 are protruding from and perpendicularly to the lateral piece adjacent to an outer edge of the lateral piece. The third fastener 1211 is farther away from the aluminum member 10 and there is a fixed distance between the third and fourth fasteners 1211 and 1212. The second protrusion 122 is level with the first major surface of the aluminum member 10.

A fixed interval is preserved between the second protrusion 122 and the fourth fastener 1212. The second protrusion 122 includes a third step 1221 and a fourth step 1222, where the third step 1221 is closer to the second groove section 121.

Therefore, the first coupling element 11 of a first aluminum member 10 may be detachably coupled to the second coupling element 12 of a second aluminum member 10, and the second coupling element 12 of the first aluminum member 10 may be coupled to the first coupling element 11 of a third aluminum member 10. An aluminum assembly of various forms may be constructed in this way.

Figure 5:
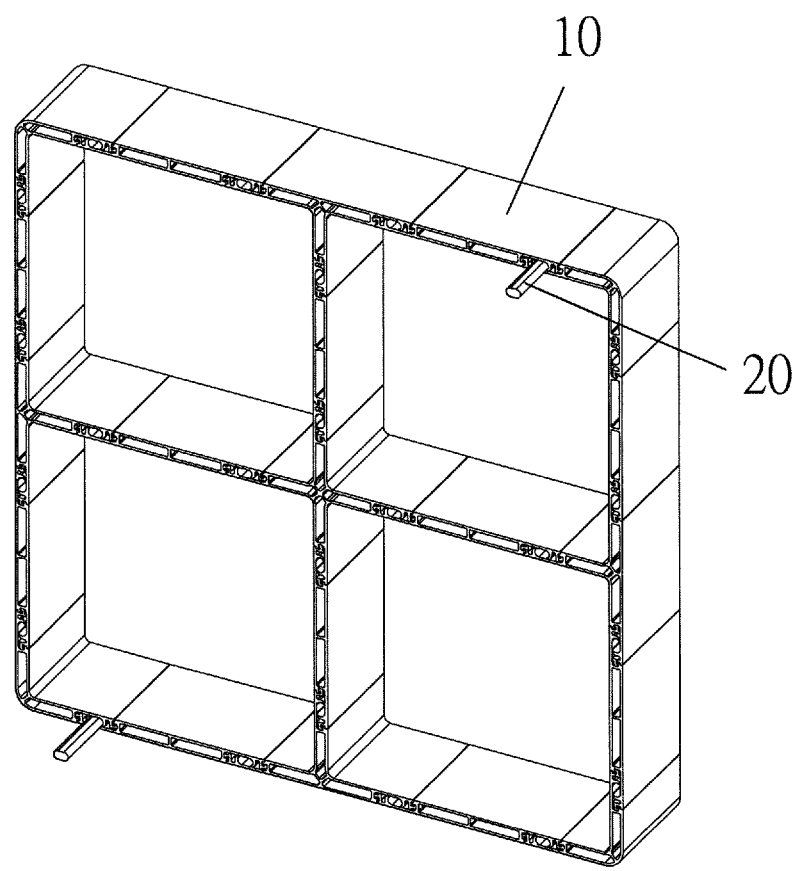
FIG. 5 is a perspective diagram showing an aluminum assembly put together using the aluminum members of FIGS. 1 to 4.

As shown in FIG. 5, a shelf is formed as described above using a number of plate-shaped, cross-shaped, T-shaped, and L-shaped aluminum members 10.

Figure 6:
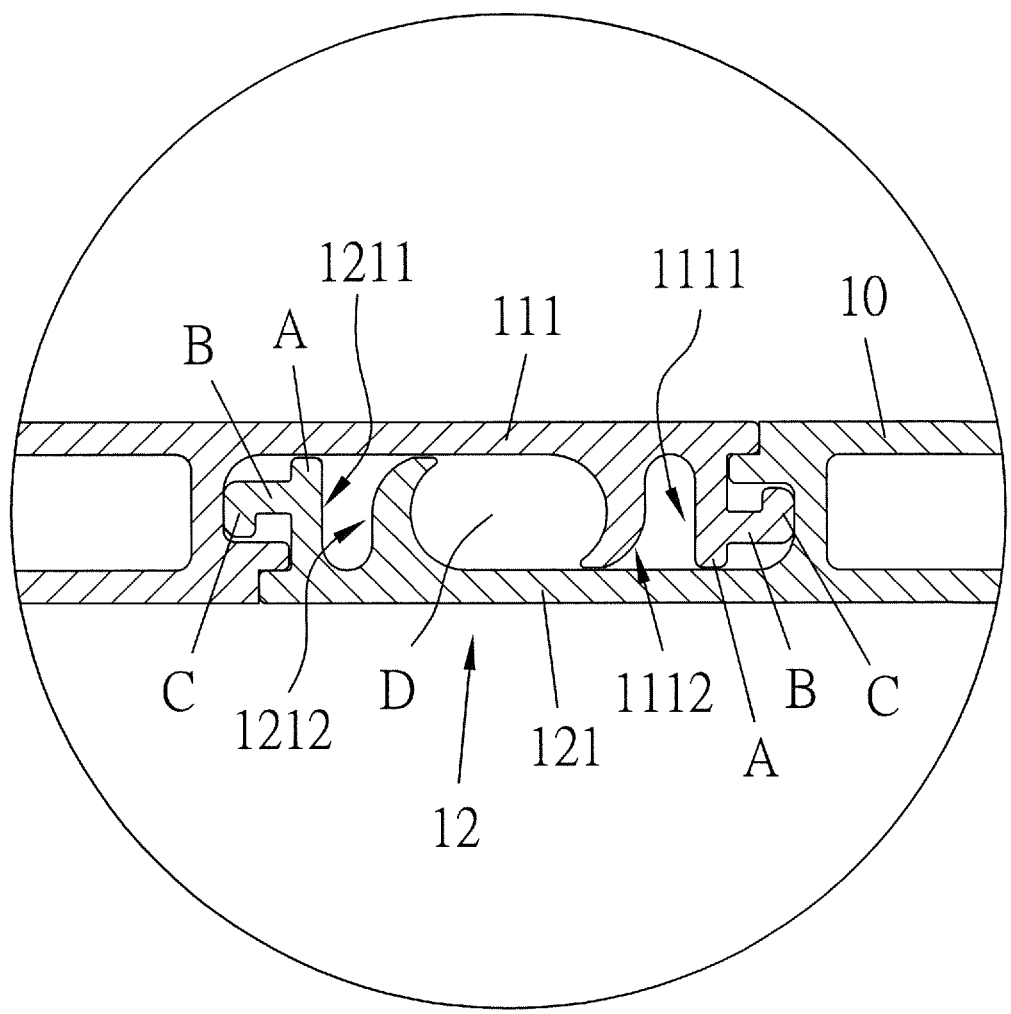
FIG. 6 is an enlarged diagram showing where neighboring aluminum members are coupled.

As shown in FIG. 6, each of the first fastener 1111 and the third fastener 1211 includes a vertical piece A and a lateral arm B. The lateral arm B is laterally extended from the vertical piece A away from the first or second edge of the aluminum body 10. Each lateral arm B has a bend C at its outer end towards the first or second groove section 111 or 121.

Each of the second fastener 1112 and the fourth fastener 1212 has a cross-sectional shape including an outer curve and an inner curve, where the outer curve is closer to the vertical piece A, and the inner curve is concaved away from the aluminum member 10.

As shown in FIG. 6, when the first coupling element 11 of a first aluminum member 10 is coupled to the second coupling element 12 of a second aluminum member 10, the first groove section 111 of the first aluminum member 10 contacts with the fourth step 1222 of the second aluminum member 10. The bend C of the first fastener 1111 of the first aluminum member 10 is headed towards the third step 1221 of the second aluminum member 10. The tip of the vertical piece A of the first aluminum member 10 contacts with the second groove section 121 of the second aluminum member 10. A channel D is jointly formed by the first and second groove sections 111 and 121 of the first aluminum member 10 and the second aluminum member 10, which is bounded by the lateral pieces and the inner curves of the second and fourth fasteners 1112 and 1212. This channel D allows a pin member 20 to plug in so that the first and second aluminum members 10 are reliably coupled together.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An aluminum assembly, comprising a plurality of aluminium members, wherein
    each aluminium member comprises a first coupling element and a second coupling element that are respectively provided along the aluminium member's two edges;
    the first coupling element comprises a first groove section and a first protrusion, both extended laterally from a first edge of the aluminium member;
    the first groove section comprises a first lateral piece, a first fastener, and a second fastener, the first and second fasteners protruding from and perpendicularly to the first lateral piece adjacent to an outer edge of the first lateral piece;
    the first fastener is farther away from the aluminium member with a fixed distance between the first and second fasteners;
    a fixed interval is preserved between the first protrusion and the second fastener;
    the first protrusion comprises a first step and a second step, with the first step being closer to the first groove section;
    the second coupling element comprises a second groove section and a second protrusion, both extended laterally from a second edge of the aluminium member;
    the second groove section comprises a second lateral piece, a third fastener, and a fourth fastener, the third and fourth fasteners protruding from and perpendicularly to the second lateral piece adjacent to an outer edge of the second lateral piece;
    the third fastener is farther away from the aluminium member with a fixed distance between the third and fourth fasteners;
    a fixed interval is preserved between the second protrusion and the fourth fastener;
    the second protrusion comprises a third step and a fourth step, with the third step being closer to the second groove section;
    each of the second fastener and the fourth fastener has a cross-sectional shape comprising an outer curve and an inner curve, with the outer curve being closer to the first or third fastener, and the inner curves are concaved away from the aluminum member;
    the first coupling element of a first aluminum member is detachably coupled to the second coupling element of a second aluminum member, thereby constructing the aluminum assembly into various forms;
    a channel is jointly formed by the first and second groove sections of the first aluminum member and the second aluminum member, which is bounded by the first and second lateral pieces and the inner curves of the second and fourth fasteners; and
    the channel allows a pin member to plug in so that the first and second aluminum members are reliably coupled together,
    wherein each of the first fastener and the third fastener comprises a vertical piece protruding from the first or second lateral piece and a lateral arm laterally extended from the vertical piece away from the first or second edge of the aluminum body; and each lateral arm has a bend at an outer end towards the first or second groove section and away from the vertical piece; and
    wherein when the first coupling element of the first aluminum member is coupled to the second coupling element of the second aluminum member, the first groove section of the first aluminum member contacts with the fourth step of the second aluminum member; the bend of the first fastener of the first aluminum member is headed towards the third step of the second aluminum member, a lateral side of the bend being in contact with an edge of the second aluminum member; the tip of the vertical piece of the first aluminum member contacts with the second groove section of the second aluminum member; a tip of the second fastener contacts with the second groove section of the second aluminum member.

2. The aluminum assembly according to claim 1, wherein the first groove section is level with a first major surface of the aluminium member; the first protrusion is level with a second major surface of the aluminium member opposite to the first major surface; the second groove section is level with the second major surface of the aluminum member; and the second protrusion is level with the first major surface of the aluminum member.

3. The aluminum assembly according to claim 1, wherein the aluminum member has a plate shape, an extruded cross shape, an extruded L shape, or an extruded T shape.

\* \* \* \* \*